Jan. 1, 1924

J. W. HUBBLE

TIRE CHAIN FASTENER

Filed July 3, 1922

1,479,074

Inventor.
Joel W. Hubble
By: Charles LaPonte Atty.

Patented Jan. 1, 1924.

1,479,074

UNITED STATES PATENT OFFICE.

JOEL W. HUBBLE, OF JACKSONVILLE, ILLINOIS.

TIRE-CHAIN FASTENER.

Application filed July 3, 1922. Serial No. 572,368.

*To all whom it may concern:*

Be it known that I, JOEL W. HUBBLE, a citizen of the United States, a resident of Jacksonville, in the county of Morgan and State of Illinois, have invented new and useful Improvements in a Tire-Chain Fastener, of which the following is a specification.

This invention is for an article of manufacture designed to serve as a fastener for tire-chains, when applied to automobile tires.

It has for its principal object a fastener of that character shown and described in Letters Patent No. 1,362,314 issued to me December 14, 1920, i. e.,—one that is self contained and does not require the use of additional guards or clasps to hold the same in proper relation to the tire chain after being adjusted, thereby eliminating the necessity of the usual tool for attaching and detaching fasteners of this description.

That the invention may be more fully understood, reference is had to the accompanying drawings forming part of the description illustrating a preferred embodiment of the invention, in which:—

Like characters denote corresponding parts thruout the figures.

Figure 1:
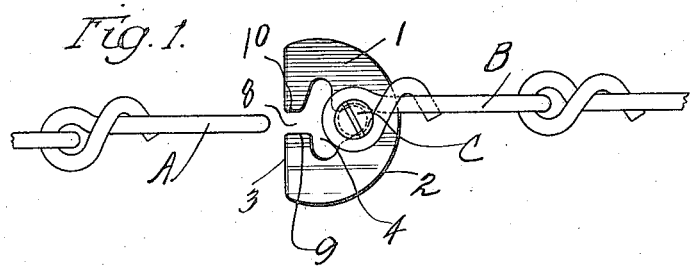
Figure 1 is a side elevation of the fastener in the position it is caused to assume when attaching or detaching the fastening end of a tire-chain.

The article in its preferred form is a segment conforming substantially to a segment of a circle, the area of its body enclosed within a curved surface or arc and a straight edge or chord connecting the extremities of said curved surface.

More particularly described, 1 designates the article the body of which is bounded by a curved surface or arc 2 and a straight edge or chord 3 uniting the extremities of said curved surface. The body of the article is stamped, cast or otherwise suitably formed with an opening 4 therethru the wall of which is preferably sinuous shaped and having seats or pockets 5, 6 and 7, and said opening communicates with a slot 8 opening out of the body through the straight edge 3 mediate its ends. The opposite walls 9 and 10 of said slot are respectively long and short, relatively to each other. The axis of the seat 6 is approximately directly opposite the slot 8 and the axes of the seats 5 and 7 are preferably approximately midway between the axis of the seat 6 and the slot 8 and on opposite sides of a line drawn through the center of the slot 8 and intersecting the axis of the seat 6.

For convenience in illustrating the use and function of the article, opposite ends of a tire-chain are shown; the attaching link A at one end and the attached link B at the other end. The link B is intended to be permanently fastened to the article 1 by a rivet or bolt C, the diameter of which will prevent its passage through the slot 8 and which conforms to the sizes of the seats 5 and 6 and receivable therein. The link A is intended for attachment to and detachment from the article 1 by inserting and removing the same through the slot 8, and when inserted into the article adapted to be seated in the seat 7. The wall of said seat being preferably inclined, as shown, to the short wall 10 of the slot 8.

Figure 3:
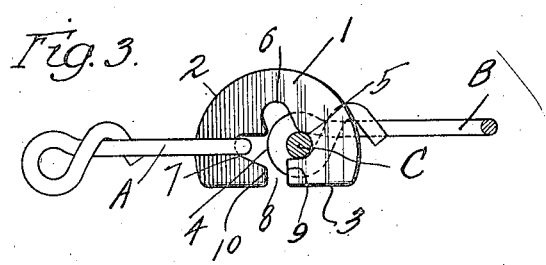
Figure 3 is a view showing the fastener turned quarter way around, or in the position it is caused to assume when the tirechain has been fastened to a tire.
Figure 4:
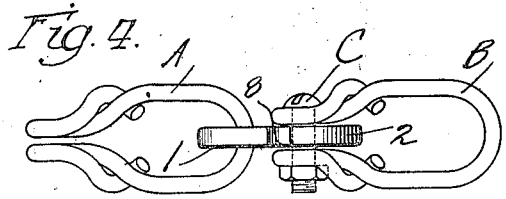
Figure 4 is an edge view of the fastener.
Figure 5:
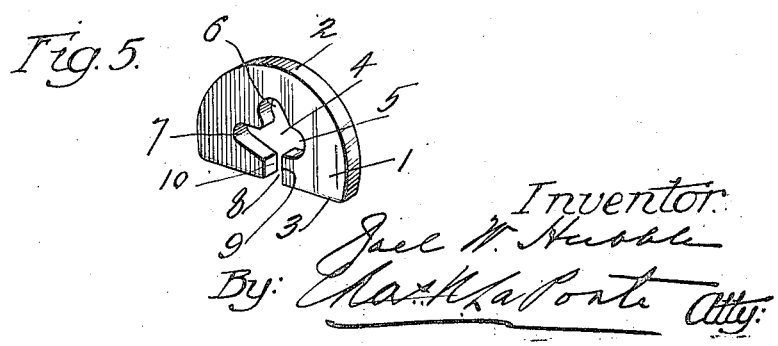
Figure 5 is a perspective view of the fastener.

The position of the parts, as shown in Figure 3, is substantially as they would appear when applied to a tire-chain. There being sufficient body between the curved surface 2 and the opening 4 therein to lend the necessary strength to withstand any pressure against the curved surface caused by the article coming into contact with hard and stony surfaces, rocks, ruts, etc., which, if the body was not strong would tend to crush the walls, cramp the links and rivet or bolt and destroy the usefulness of the device. As constructed, this cannot happen in this device.

Figure 2:
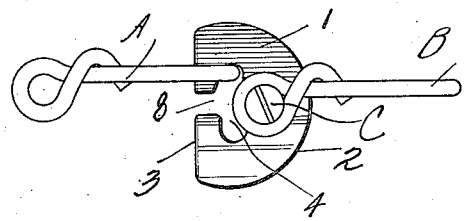
Figure 2 is a view showing the fastener in the same position as in Figure 1 and the fastening end of the chain slipped into securing position in the fastener.

To attach a chain to a tire, using my fastener, the fastener is turned into the position shown in Figure 1 causing the rivet or bolt C to move from the seat 5 into the seat 6. The link A is then inserted through the slot 8 and caused to be seated in the seat 7, it being impossible to pass the link C into the seat 5 owing to the length of the wall 9 and the curved end of the link B which are positioned so close that the link A may not pass therebetween. The parts then assume the position shown in Figure 2, when the fastener 1 is turned to the position shown in Figure 3, the rivet or bolt C leaving the seat 6 and being caused to enter the seat 5. In this position, the link A may not become detached from the fastener because the end of the link B is positioned so close to the wall 10 of the slot 8 that the link A cannot pass therebetween. A reversal of the fastener from the position shown in Figure 3 to the position shown in Figure 1 will permit the link A to be detached with ease and dispatch from the fastener 1 and the chain removed from the tire.

What I claim is:—

1. In a tire chain fastener, a body having a slot opening through a wall thereof, and provided with a substantially central opening having opposite walls which are formed with substantially alined chain-engaging seats, one of said walls having a second chain-engaging seat located beyond the first named chain-engaging seat of said wall of the opening.

2. An article of manufacture, comprising a body substantially a segment of a circle bound by a curved surface and a straight edge uniting the extremities of said curved surface, said body having an opening therethrough the wall of which is sinuous shaped and communicating with a slot opening out of said straight edge, one wall of which is longer than the other.

3. A one piece fastener for tire-chains comprising a body bounded by a curved surface and a straight edge uniting the extremities of said curved surface, the body formed with an opening therethrough the wall of which is sinuous shaped to provide a plurality of seats, and said opening communicating with a slot opening out of said straight edge midway its ends, the opposite walls of which are of different lengths.

4. A one piece fastener for tire-chains comprising a body having an opening therethrough in communication with a slot opening out of one edge of said body, the wall of said opening being sinuous shaped to provide a plurality of seats, the axis of one seat being approximately opposite said slot, and the axes of the other seats lying between said slot and seat opposite thereto and on opposite sides of a line drawn through the slot and intersecting the axis of the seat opposite the same.

5. A one piece fastener for tire-chains comprising a body having an opening therethrough communicating with a slot opening out of the edge of the body through which the link of a tire chain may be inserted or withdrawn, the opposite walls of said slot being of different lengths, and the wall of said opening being sinuous shaped and providing a plurality of seats, two of which are adapted to receive a coupling member permanently fastening one link of a tire chain to said fastener and the other of said seats adapted to receive the fastening link of a chain.

6. In a tire chain fastener, a body having an opening and an entrance slot leading thereinto, said opening having walls one of which has two spaced seats, one of said seats being formed to receive and hold one end of a tire chain and the other seat being formed to receive the other end of the tire chain in one position of the body, the other wall of the opening having a seat to receive the last named end of the tire chain from the said other seat of the pair of seats and to hold same in a second position of the body.

In witness whereof, I have hereunto affixed my hand this 28th day of June, 1922.

JOEL W. HUBBLE.